(12) United States Patent
Cudak et al.

(10) Patent No.: US 10,044,652 B2
(45) Date of Patent: Aug. 7, 2018

(54) CONTEXT DRIVEN MODIFICATION OF ATTACHMENTS IN A MESSAGING SESSION

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 1181 days.

(21) Appl. No.: 13/913,720

(22) Filed: Jun. 10, 2013

(65) Prior Publication Data

US 2014/0359028 A1 Dec. 4, 2014

Related U.S. Application Data

(63) Continuation of application No. 13/905,084, filed on May 29, 2013.

(51) Int. Cl.
*G06F 15/16* (2006.01)
*H04L 12/58* (2006.01)

(52) U.S. Cl.
CPC ............ *H04L 51/08* (2013.01); *H04L 51/063* (2013.01)

(58) Field of Classification Search
None
See application file for complete search history.

(56) References Cited

U.S. PATENT DOCUMENTS

| | | | |
|---|---|---|---|
| 7,895,271 B1* | 2/2011 | Malik | G06Q 10/107 709/206 |
| 8,150,921 B2* | 4/2012 | Katsuda | G06Q 10/107 709/206 |
| 8,185,741 B1* | 5/2012 | Agrawal | H04L 9/3247 713/176 |
| 2002/0059383 A1* | 5/2002 | Katsuda | G06Q 10/107 709/206 |
| 2004/0001090 A1 | 1/2004 | Brown et al. | |
| 2005/0044158 A1* | 2/2005 | Malik | H04L 51/066 709/206 |
| 2012/0117159 A1* | 5/2012 | Chakra | G06Q 10/107 709/206 |

* cited by examiner

*Primary Examiner* — Esther B Henderson
(74) *Attorney, Agent, or Firm* — Steven M. Greenberg, Esq.; CRGO Law

(57) ABSTRACT

Embodiments of the present invention provide a method, system and computer program product for message attachment modification based upon determined context. In an embodiment of the invention, a method for message attachment modification based upon determined context is provided. The method includes loading into memory a message referencing a file to be transmitted to a recipient, determining a context for the transmission of the message, modifying the file according to the determined context, and transmitting the message with the modified file to the recipient.

15 Claims, 2 Drawing Sheets

CONTEXT DRIVEN MODIFICATION OF ATTACHMENTS IN A MESSAGING SESSION

CROSS-REFERENCE TO RELATED APPLICATIONS

This application claims priority to U.S. patent application Ser. No. 13/905,084, currently pending, filed May 29, 2013, the entirety of which are incorporated herein by reference.

BACKGROUND OF THE INVENTION

Field of the Invention

The present invention relates to messaging session management and more particularly to file transfer operations during a messaging session Description of the Related Art Messaging has proven to be the most ubiquitously utilized aspect of globally connected computing. Messaging has evolved from simple internal electronic messaging and rudimentary chat sessions to modern robust reliable electronic mail, instant messaging and text messaging. Electronic mail, instant messaging and text messaging differ in terms of immediacy and supporting infrastructure. In the case of electronic mail, different "e-mail" clients interact with one or more e-mail servers to facilitate the asynchronous exchange of e-mail messages over the global Internet in most cases. In the case of instant messaging, as in the case of e-mail, different instant messaging clients communicate by way of one or more common instant messaging servers. However, unlike e-mail, in instant messaging, communications are synchronous in nature. Finally, in the case of text messaging, the telephone infrastructure supports the synchronous exchange of messages in real time.

Modern message exchanges provide for the basis exchange of textual messages. More advanced messengers also permit the exchange of light imagery such as "emoticons". Even more advanced messengers support the exchange of attached files. In particular, in the case of e-mail messaging, a file attachment can be transmitted along with an e-mail message and in some cases where the file contains an image, the image itself can be rendered as part of the e-mail message. In the case of text messaging, also an attached file containing an image can be rendered inline with text, or the attached file can be provided separately with a linked reference in the text message. Finally, in the case of instant messaging, an attached file can be included by reference to a textual form of an instant message.

Not all attachments, however, contain imagery. In many cases, attachments are other documents or images of documents. For many of these types of attachments, the documents can be very large in size, sometimes spanning, dozens, hundreds or even thousands of pages. Transmitting a file of so many pages can mean transmitting a file of especially large size. Storing message exchanges with large file attachments therefore can become somewhat of a resource waste. Especially, it is to be recognized that in any given attachment, in many circumstances only a small portion of the attached file is relevant to the context of the message exchange.

BRIEF SUMMARY OF THE INVENTION

Embodiments of the present invention address deficiencies of the art in respect to attachment management in messaging and provide a novel and non-obvious method, system and computer program product for selective message attachment based upon message context. In an embodiment of the invention, a method for message attachment modification based upon determined context is provided. The method includes loading into memory a message referencing a file and designated for delivery to a recipient, determining a context for the transmission of the message, modifying the file according to the determined context, and transmitting the message with modified file to the recipient.

In another embodiment of the invention, a messaging data processing is provided. The system includes a host computing system that includes one or more computers each with one or more processors and memory. The system also includes a messaging server executing in the memory of the host computing system and different messaging clients each disposed in a different computer communicatively coupled to the host computing system over a network, each of the messaging clients exchanging messages with one another as managed by the messaging server. Finally, the system includes a message modification module communicatively coupled to each of the clients and the server. The module includes program code enabled to load into memory a message referencing a file and designated for delivery to a recipient, to determine a context for the transmission of the message, to modify the file according to the determined context, and to transmit the message with the modified file to the recipient.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for message attachment modification based upon a determined context for the transmission of a message. In accordance with an embodiment of the invention, a message can be loaded into memory for transmission to a recipient over a computer communications network. The message can reference a file, for example as an attachment to the message. A context can be determined for the transmission of the message, for example a keyword reference to a portion of the file, or an environmental parameter such as an identity of the end user composing the textual message, an intended mode of processing an attachment to the message, a type of device designated to receive the message and process an attachment to the message, a date and/or time of the message, or a temporal limitation imposed upon the viewing of an attachment to the message. Thereafter, the file can be modified according to the context. Finally, the textual message and file can be transmitted to the recipient with the file over the computer communications network. In this way, only a contextually relevant portion of the file can be transmitted to the recipient.

Figure 1:
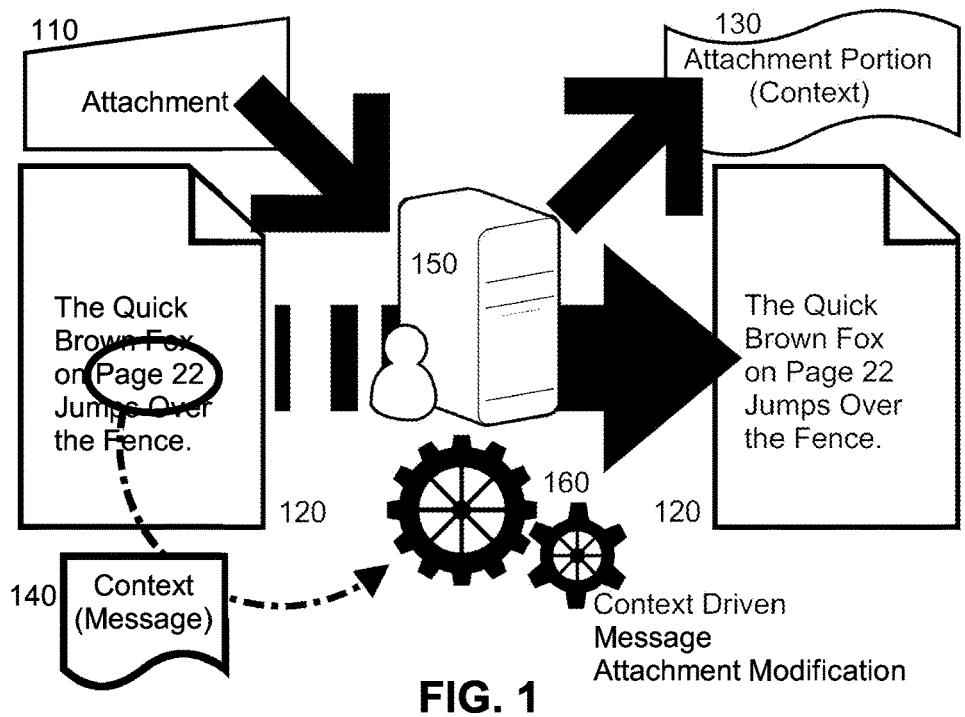
FIG. 1 is a pictorial illustration of a process for message attachment modification based upon message context.

In further illustration, FIG. 1 pictorially shows a process for message attachment modification based upon a determined context. As shown in FIG. 1, a textual message 120 can be provided to a messaging server 150 for delivery to a designated recipient. An attachment 110 further can be specified for the textual message 120. In response to the receipt of the textual message 120 designated for delivery to the recipient, selective message attachment logic 160 can determine a context 140 for the textual message 120. For instance, the context 140 can be a reference to the portion 130 of the attachment. Thereafter, the context driven message attachment modification logic 160 can modify the attachment 110 to only a contextually relevant modified attachment 130 pertinent to the determined context 140. Finally, the textual message 120 and the modified attachment 130 in lieu of the entire attachment 110 can be delivered to the designated recipient.

Figure 2:
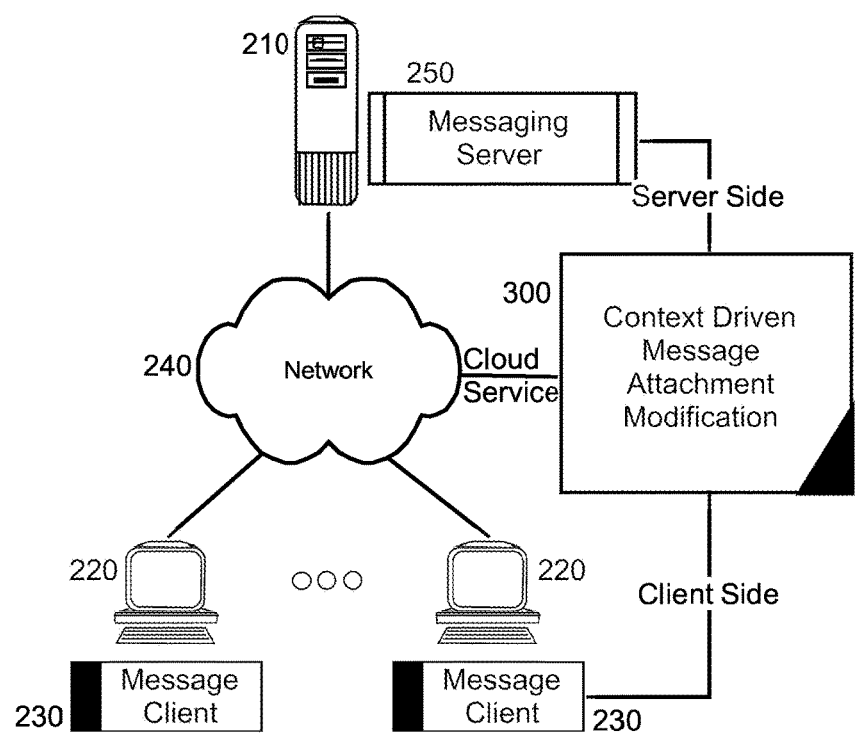
FIG. 2 is a schematic illustration of a messaging data processing system configured for message attachment modification based upon message context; and, FIG. 3 is a flow chart illustrating a process for message attachment modification based upon message context.

The process described in connection with FIG. 1 can be implemented within a messaging data processing system. In yet further illustration, FIG. 2 schematically shows a messaging data processing system configured for message attachment modification based upon a determined context. The system can include a host computing system 210 that includes one or more computers each with memory and at least one processor. The host computing system 210 can support the execution of a messaging server 250 managing messages exchanged between different messaging clients 230 in respectively different computers 220 over a computer communications network 240. In this regard, the messaging server 250 can be an e-mail server configured to manage the exchange of e-mail messages over a data communications network, an instant messaging server configured to manage the exchange of instant messages over a computer communications network, or even a text messaging server configured to manage the exchange of text messages over a telecommunications network.

Of note, a context driven message attachment modification module 300 can execute in memory of a computer such as a computer in the host computing system 210, the computer 220 hosting messaging client 230, or within another computer communicatively coupled to each of the messaging clients 230 over computer communications network 240. The module 300 can include program code enabled upon execution in memory of a computer to load into memory a message directed for transmission over the network 240 from one of the messaging clients 230 for viewing in another of the messaging clients 230. The message can reference a file to be attached to the message and delivered with the message, for example a document, an audio file, a video file, or an audio-visual file.

The program code further can be enabled to determine a context for the transmission of the message, based upon the content of the message, or the content of a prior message received in the host messaging client 230 from a designated recipient of the message. For instance, the context can include a reference in the message or a prior message to a portion of the file. The context also can include a reference in the message or a prior message of a characteristic of a host computing device of the messaging client 230 in which the attached file is to be viewed. The context yet further can include a reference in the message or a prior message to a temporal limitation of an individual designated to receive the file as an attachment.

In response to the determination of the context for the transmission of the message, the program code of the module 300 additionally can be enabled to modify the file so as to be reduced to only a contextually pertinent portion of the file. In this regard, the program code of the module 300 can be enabled to extract only a specified portion of the file consistent with the determined context for inclusion as an attachment to the message. Alternatively, the program code of the module 300 can reduce a size of the file in general to accommodate the physical limitations of a computing device supporting the messaging client 230 in which the attachment is to be viewed. As yet another alternative, the program code of the module 300 can remove a video portion of an audio-visual file so that only an audio portion is delivered to a designated recipient intending only to listen to the audio portion as evidenced by the context. In any circumstance, thereafter, the modified form of the file can be included with the message as an attachment in lieu of the original file before forwarding the text message with new attachment to the designated recipient.

Figure 3:
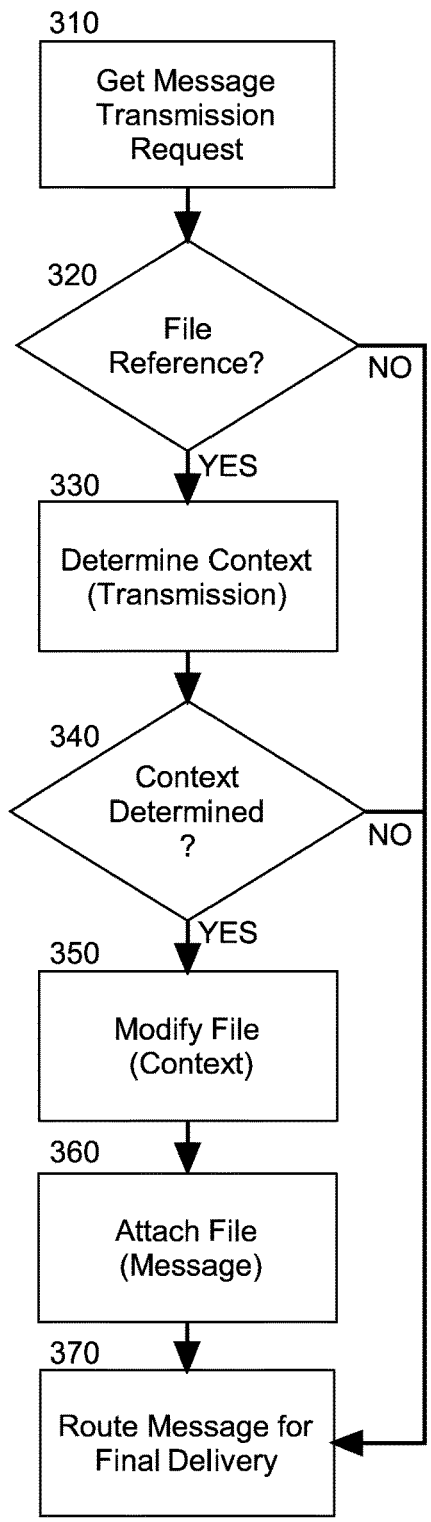

In even yet further illustration of the operation of the selective attachment module 300, FIG. 3 is a flow chart illustrating a process for message attachment modification based upon a determined context. Beginning in block 310, a message transmission request can be received for transmitting a message loaded into memory to a designated recipient over a network. In decision block 320, it can be determined whether or not the message references a file such as an attachment to the message. If not, the process can complete with the routing of the message for final delivery to the designated recipient in block 370. Otherwise, the process can continue through block 330.

In block 330, a context for the transmission of the message can be determined. For instance, the text of the message (including text embedded therein from prior exchanged messages) can be parsed and certain keywords identified indicative of the context. Examples include a reference to a page number, chapter number or section number of the attached file, an indication that a computing device of the designated recipient is limited in physical resources such as memory or display space or network bandwidth, or that the designated recipient enjoys only a limited period of time to review the attachment. In block 340, it can be determined whether or not the context of the transmission of the message had been successfully determined. If not, the process can complete with the routing of the message for final delivery to the designated recipient in block 370. Otherwise, the process can continue through block 350.

In block 350, the determined context can be mapped to a file modification action, for example a reduction of a document to a particular page or set of pages, the reduction in size of an image or video, the removal of a video portion of an audio-visual file, or the reduction in size of an audio-visual file to only a designated portion. Thereafter, the file can be modified according to the mapped action and in block 360 the modified file can be attached to the message. Finally, in block 370, the process can complete with the routing of the message with the attached file for final delivery to the designated recipient.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for message attachment modification based upon determined context, the method comprising:
   loading into memory a message referencing a file to be transmitted to a recipient;
   determining a context for transmitting the message based upon a reference in the message or in a prior message to a characteristic of the file referenced by the message;
   modifying the file according to the determined context by identifying a portion of the file contextually relevant to the determined context and modifying the file to remove other portions of the file not contextually relevant to the determined context; and,
   transmitting the message with modified file to the recipient.

2. The method of claim 1, wherein the message is one of a text message, an e-mail message and an instant message.

3. The method of claim 1, wherein the context is a reference to one or more pages of the file and the file is modified to include only the pages referenced in the context.

4. The method of claim 1, wherein the context is a determination of limited resources available to the recipient to view the attached file and the file is modified to a smaller size.

5. The method of claim 1, wherein the context is a reference by the recipient to an audio portion of an audio-visual file and the file is modified to exclude a video portion of the audio-visual file.

6. A messaging data processing system comprising:
   a host computing system comprising one or more computers each with one or more processors and memory;
   a messaging server executing in the memory of the host computing system;
   a plurality of different messaging clients each disposed in a different computer communicatively coupled to the host computing system over a network, the messaging clients exchanging messages with one another as managed by the messaging server; and,
   a message attachment modification module communicatively coupled to each of the clients and the server, the module comprising program code enabled to load into memory a message referencing a file to be transmitted to a recipient, to determine a context for transmitting the message based upon a reference in the message or in a prior message to a characteristic of the file referenced by the message, to modify the file according to the determined context by identifying a portion of the file contextually relevant to the determined context and modifying the file to remove other portions of the file not contextually relevant to the determined context, and to transmit the message with the modified file to the recipient.

7. The system of claim 6, wherein the message is one of a text message, an e-mail message and an instant message.

8. The system of claim 6, wherein the context is a reference to one or more pages of the file and the file is modified to include only the pages referenced in the context.

9. The system of claim 6, wherein the context is a determination of limited resources available to the recipient to view the attached file and the file is modified to a smaller size.

10. The system of claim 6, wherein the context is a reference by the recipient to an audio portion of an audio-visual file and the file is modified to exclude a video portion of the audio-visual file.

11. A computer program product for message attachment modification based upon determined context, the computer program product comprising:
    a computer readable storage memory device having computer readable program code embodied therewith, the computer readable program code comprising:
    computer readable program code for loading into memory a message referencing a file to be transmitted to a recipient;
    computer readable program code for determining a context for transmitting the message based upon a reference in the message or in a prior message to a characteristic of the file referenced by the message;
    computer readable program code for modifying the file according to the determined context by identifying a portion of the file contextually relevant to the determined context and modifying the file to remove other portions of the file not contextually relevant to the determined context; and,
    computer readable program code for transmitting the message with modified file to the recipient.

12. The computer program product of claim 11, wherein the message is one of a text message, an e-mail message and an instant message.

13. The computer program product of claim 11, wherein the context is a reference to one or more pages of the file and the file is modified to include only the pages referenced in the context.

14. The computer program product of claim 11, wherein the context is a determination of limited resources available to the recipient to view the attached file and the file is modified to a smaller size.

15. The computer program product of claim 11, wherein the context is a reference by the recipient to an audio portion of an audio-visual file and the file is modified to exclude a video portion of the audio-visual file.

* * * * *